United States Patent
Angelo et al.

(10) Patent No.: US 6,190,051 B1
(45) Date of Patent: Feb. 20, 2001

(54) ROLLER CONTACT BEARING WITH A SEALING DEVICE AND A DEVICE FOR ROTATION SPEED

(75) Inventors: Vignotto Angelo; Cherio Pierangelo, both of Turin (IT)

(73) Assignee: SKF Industrie S.p.A., Turin (IT)

( * ) Notice: Under 35 U.S.C. 154(b), the term of this patent shall be extended for 0 days.

(21) Appl. No.: 09/255,215

(22) Filed: Feb. 22, 1999

(30) Foreign Application Priority Data

Feb. 24, 1998 (IT) .............................................. TO98A0140

(51) Int. Cl.[7] ...................................................... F16C 19/00
(52) U.S. Cl. ........................... 384/448; 384/445; 384/446
(58) Field of Search .................................. 384/448, 445, 384/446, 449, 447

(56) References Cited

U.S. PATENT DOCUMENTS

| | | | |
|---|---|---|---|
| 3,564,477 | 2/1971 | Pompei | 339/5 |
| 4,502,739 | 3/1985 | Flander | 384/481 |
| 4,856,916 | 8/1989 | Ito et al. | 384/477 |
| 5,139,425 | 8/1992 | Daviet et al. | 439/17 |
| 5,454,724 | 10/1995 | Kloeppel et al. | 439/17 |
| 5,567,058 | 10/1996 | Morita et al. | 384/448 |
| 5,575,568 | * 11/1996 | Rigaux et al. | 384/448 |
| 5,863,135 | 1/1999 | Bildtsen et al. | 384/477 |

FOREIGN PATENT DOCUMENTS

| | | |
|---|---|---|
| 42 31 033 | 8/1993 | (DE) . |
| 0 005 707 | 12/1979 | (EP) . |
| 0 475 841 B1 | 3/1992 | (EP) . |
| 0 522 933 | 1/1993 | (EP) . |
| 0 607 719 | 7/1994 | (EP) . |
| 0 675 364 | 10/1995 | (EP) . |
| 0 681 185 | 11/1995 | (EP) . |
| 0 726 468 | 8/1996 | (EP) . |
| 0 875 700 | 11/1998 | (EP) . |
| 63-043067 | 2/1988 | (JP) . |
| 7-127647 | 5/1995 | (JP) . |

OTHER PUBLICATIONS

European Search Report, 3 pages, dated May, 3, 2000.

* cited by examiner

*Primary Examiner*—Charles A Marmor
*Assistant Examiner*—Tisha D. Waddell
(74) *Attorney, Agent, or Firm*—Merchant & Gould P.C.

(57) ABSTRACT

A roller contact bearing unit, in particular for the hub of a vehicle wheel, including a radially outer rotating race (10), a radially inner stationary race (11), a sealing device (16) between the races (10, 11) and a device for measuring the rotation speed of the outer race (10). The measuring device includes an encoder wheel (13) in the form of a radially oriented annular disc made of plastic or rubber magnetized material, and an annular insert made of non-magnetic metal (14) which is suitably shaped to form: a constraining means (14*a*) for fixing the insert (14) onto the outer race of the bearing unit, an axial abutting means (14*b*) suitable for abutting against a lateral surface (10*b*) of the outer race (10), an annular seat (14*c*) for housing and externally enclosing the encoder wheel (13), and a support means (14*d*) for a rubber element (15) which forms a sealing covering (15*b*) suitable for sliding against a surface (16) which forms part of a non-rotating element (11) of the bearing unit.

10 Claims, 1 Drawing Sheet

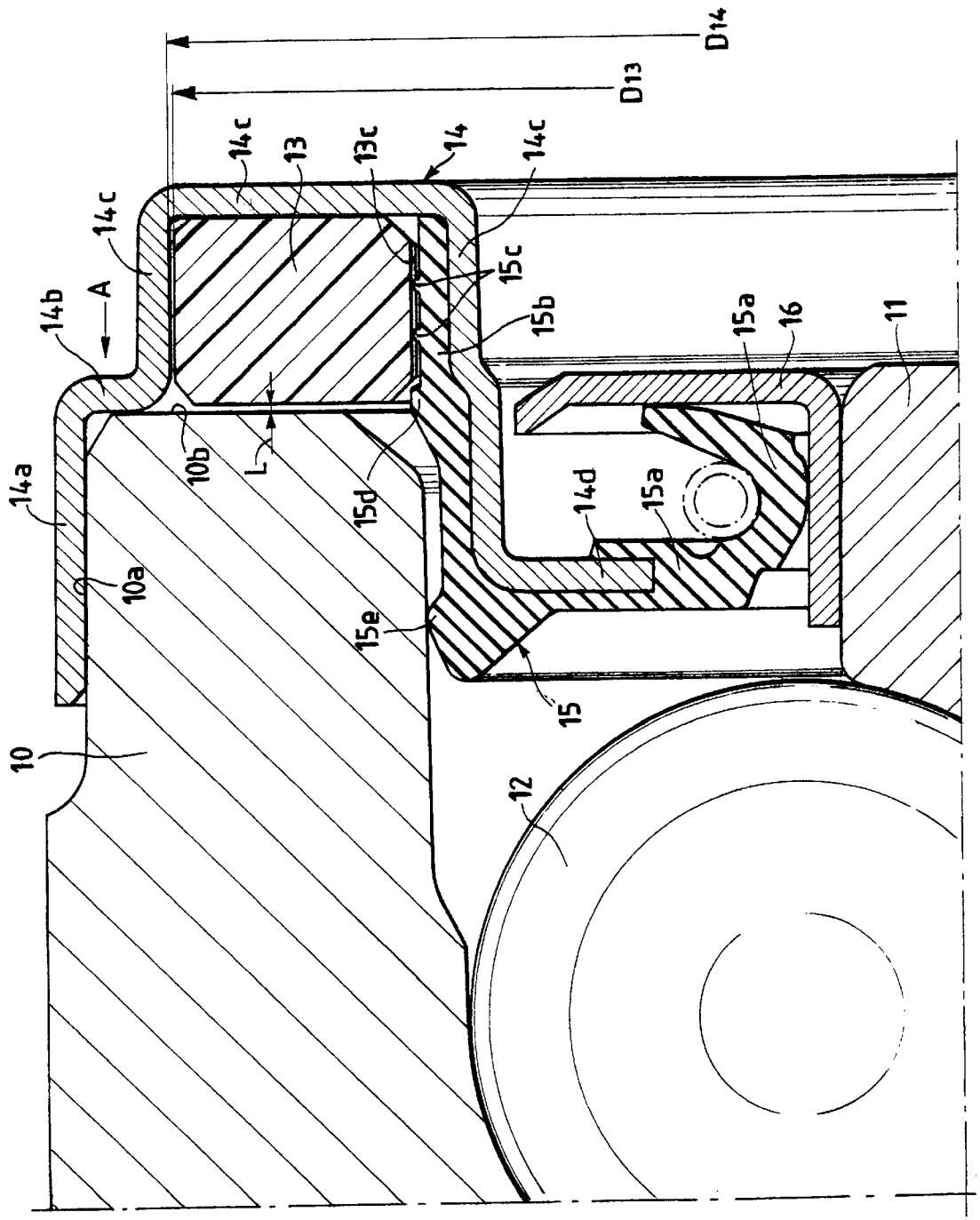

ROLLER CONTACT BEARING WITH A SEALING DEVICE AND A DEVICE FOR ROTATION SPEED

DESCRIPTION

The present invention refers to a roller bearing unit, in particular for the hub of a vehicle wheel, of the kind equipped with a sealing device and a device for measuring the rotating speed of the outer race.

Known measuring devices of the aforementioned type comprise an encoder wheel in the form of an annular disc of plastic or rubber magnetised material, which is rotatably secured to the rotating race of the bearing. In some well-known types of device, the encoder wheel is driven onto the rotating race of the bearing (usually the radially outer race) or onto an element fixedly connected to it.

It has however been found that encoder wheels of this type do not stand up very well to the stress to which they are subjected when they are driven; furthermore, encoder wheels fitted in this way are exposed to the action of external contaminating agents such as water, dust, mud, metal particles from nearby brake devices etc; when said contaminating agents come into contact with said encoder wheels their performance tends to be impaired and the signal produced by a sensor which picks up variations in magnetic flow generated by the rotating encoder wheel can be adversely affected. Metal particles have a particular tendency to adhere to any slight irregularity or roughness in the surface of an encoder wheel made of rubber or plastic magnetised material.

Other well-known kinds of device involve an encoder wheel, made of plastic or rubber which is not yet magnetised, which is vulcanised onto an annular metal support insert and then magnetised together with it. This kind of magnetising technique, besides being both complex and expensive, does not permit the attainment of optimal levels of magnetisation in the encoder wheel.

An aim of the present invention is to realise a robust, reliable arrangement which will remove the risk of the encoder wheel's being damaged during assembly, transport or use.

Another aim of the present invention is to realise a bearing unit equipped with a device for measuring rotation speed to which metal particles attracted by the magnetic encoder wheel will not have a tendency to adhere.

A further aim of the present invention is to realise an arrangement which will protect the magnetised wheel from variations in temperature caused by the proximity of the vehicle's brakes to the hub.

According to the present invention, these and other aims and advantages, as detailed in independent claim 1, are achieved by a bearing unit equipped with a device for measuring rotation speed integrated with a sealing device and equipped with a metallic insert which performs a dual function as an element of support and protection for the encoder wheel and as the support for a covering seal made of rubber. Other important characteristics of the present invention are defined in dependent claims 2 to 10.

There will now be described the structural and functional characteristics of some preferred but not limiting embodiments of the bearing unit according to the present invention, reference being made to the accompanying drawing, which is a partial view in axial section of a device according to the present invention mounted on a ball bearing unit.

With reference to the drawing, a roller contact bearing unit for the hub of a vehicle wheel comprises a radially outer rotating race 10 and a radially inner stationary race 11 between which are interposed rotating elements 12, in this case spheres.

The bearing unit is equipped with a device for measuring the rotation speed of the outer rotating race 10, said device comprises an encoder wheel 13, assembled on the rotating race, and a sensor (not illustrated), facing the encoder wheel and assembled on a fixed part of the vehicle.

The encoder wheel 13 is a radially oriented annular disc made of plastic or rubber magnetised material with alternating polarities around the circumference and mounted adjacent to the axially inner side 10b (that is to say towards the interior of the vehicle) of the radially outer rotating race 10.

According to the present invention, the encoder wheel 13 is mounted in an annular metallic insert 14 driven onto the outer race 10; the insert 14, made of non-magnetic metal, for example non-magnetic steel, is suitably shaped in such a way as to form a seat suitable for housing the encoder wheel and an extension which forms a support for the covering of the bearing unit's sealing device, as described below.

The insert 14 forms an outer cylindrical portion 14a which is driven onto the outer cylindrical wall 10a of the outer race 10 of the bearing unit; the cylindrical portion 14a is joined to a radial wall 14b suitable for abutting against the lateral surface 10b of the outer race 10. The radial wall 14b is in turn joined to a portion 14c with a C-shaped axial section which forms a seat for housing the encoder wheel 13. The radially inner part of the annular insert 14 extends to form a radial flange 14d to which is co-molded a rubber sealing element 15.

The rubber element 15 forms a radially inner portion 15a which performs essentially a sealing function by sliding against a metallic disc 16 with an L section integral with the stationary race 11 of the bearing unit, and a radially outer portion, of a substantially cylindrical shape, 15b which extends towards the interior of the C-shaped portion 14c in which is housed the encoder wheel 13 to ensure that it is locked into the seat 14c of the metallic insert 14.

The coupling of the encoder wheel 13 to the support insert 14, which is carried out before the force fitting of the insert 14 onto the bearing unit, must be effected in such a way as not to cause any yield or breakage in the encoder wheel when it is mounted onto the bearing unit. To achieve this aim, the axial dimension of the annular seat 14c in which the encoder wheel is housed is greater than that of the encoder wheel itself so as to leave, when the encoder wheel is mounted, an axial length L between the wheel 13 and the surface 10b of the race 10 which the wheel 13 faces. The force fitting thrust, which is indicated by the arrow A in the drawing, is not exercised on the magnet, but is applied to the radial wall portion 14b. The axial length L should preferably be equal to or less than 0.5 mm.

With regard to the radial dimension of the encoder wheel, its outer diameter $D_{13}$ should preferably be less than the diameter $D_{14}$ of the seat 14c in which it is housed, so as to avoid breaking the magnetised wheel when it is assembled and to permit the plastic or rubber material of which it is made to yield in response to variations in temperature without creating stress: it is well known in fact that the steel from which the insert 14 is made has a lower thermal expansion coefficient than the above-mentioned material from which the encoder wheel 13 is made.

The interface between the inner cylindrical surface of the encoder wheel 13 and the outer cylindrical surface of the cylindrical extension 15b of the rubber element 15 is suitably arranged in such a way as to realise blocking means suitable for blocking the encoder wheel in the direction of the circumference with regard to the insert 14 and the rubber element 15 which is vulcanised to it. These blocking means comprise, in the preferred form illustrated in the drawing, a number of bumps around the circumference 15c which extend radially from the surface of the cylindrical extension 15b, and of a number of axial grooves 13c in the inner cylindrical surface of the encoder wheel 13. The dimensions of the various parts should be such that, once the encoder wheel in inserted into the seat 14b, the yieldable bumps around the circumference 15c of the rubber are slightly compressed by the inner cylindrical surface of the encoder wheel and then expand to fit the axial grooves 13c, so that they form a friction block without constituting an obstacle to the insertion of the encoder wheel into its housing. The rubber of which the element 15 is made, being free of any metallic particles, is in fact more yieldable than the magnetised rubber of which the encoder wheel is made. This kind of yieldable coupling also eliminates problems of reciprocal tolerance between the encoder wheel and its support insert.

In the example illustrated in the drawing, the outer cylindrical surface of the cylindrical extension 15b also forms two radially extending borders around the circumference 15d, 15e; the first border 15d, positioned to correspond to the axially outer side of the encoder wheel 13, serves to comprise an axial blocking means which prevents the encoder wheel from slipping axially out of its housing 14b; the second border 15b is a lip designed to yieldably contact the surface of the outer race 10 so as to perfect the sealing action between the outer race 10 of the bearing unit and the metallic insert 14 which is fixed onto it.

As can be appreciated, the encoder wheel is magnetised separately from its own insert, so that optimal levels of magnetisation are obtained, and it is simply fitted into the seat comprised by the part 14c of the metallic insert 14 which encloses it externally and provides a smooth outer surface from which any magnetic particles deposited on the insert can be easily removed as a result of the centrifugal effect of the bearing unit in rotation. Furthermore, the annular insert 14 which supports the encoder wheel 13 is shaped in such a way as to provide total external protection for the encoder wheel, thus resolving the problems discussed in the introduction above. In addition, the thrust applied in force fitting does not entail any considerable overall force to the encoder wheel, as any shock involved in this operation is entirely absorbed by the support insert 14. Finally, the arrangement of the present invention permits the reduction of unexpected variations in temperature to which encoder wheels are subjected when situated near a vehicle's brakes.

What is claimed is:

1. A roller contact bearing unit, for the hub of a vehicle wheel, comprising a radially outer rotating race (10), a radially inner stationary race (11), a sealing device (16) between said races (10, 11) and a device for measuring the rotation speed of the outer race (10), in which the measuring device includes an encoder wheel (13) in the form of a radially oriented annular disc made of plastic or rubber material, characterised by the fact that it includes an annular insert of non-magnetic metal (14) which is suitably shaped to form:

a constraining means (14a) for fixing the insert (14) to the outer race of the bearing unit;

an axial abutting means (14b) suitable for abutting against a lateral surface (10b) of said outer race (10);

an annular seat (14c) for housing and externally enclosing the encoder wheel (13);

a support means (14d) for a rubber element (15) which forms a sealing covering (15b) suitable for sliding against a surface (16) which forms part of a stationary element (11) of the bearing unit wherein said rubber element (15) also forms a radially outer portion (15b) of a substantially cylindrical shape (15b) which extends to the interior of said seat (14c) to block the rotation of the encoder wheel (13) in relation to the insert (14).

2. A bearing unit according to claim 1, characterised by the fact that the encoder wheel (13) is separately magnetised before being fixed to the insert.

3. A bearing unit according to claim 1, characterised by the fact that said annular seat is comprised of a portion (14c) with a C-shaped axial section which has an axial dimension greater than that of the encoder wheel (13), so that said encoder wheel is not thrust to abut against the lateral surface (10b) of the outer race (10) when the insert (14) with a pre-assembled encoder wheel (13) is assembled onto the bearing unit (10).

4. A bearing unit according to claim 1, characterised by the fact that the encoder wheel (13) has an external diameter ($D_{13}$) smaller than the diameter ($D_{14}$) of the seat (14c) which houses it to permits the plastic or rubber material of which said encoder wheel is made to yield freely in response to variations in temperature.

5. A bearing unit according to claim 1, characterised by the fact that said cylindrical portion (15b) of the rubber element (15) has at least one raised means (15c) which is elastically yieldable in a radial direction suitable for co-operating with the inner cylindrical surface of the encoder wheel in order to perfect said rotational blocking action between the encoder wheel (13) and the insert (14).

6. A bearing unit according to claim 5, characterised by the fact that said inner cylindrical surface of the encoder wheel is provided with at least one recess (13c) suitable for co-operating with said elastically yieldable raised means (15c).

7. A bearing unit according to claim 1, characterised by the fact that said cylindrical portion (15b) of the rubber element (15) also forms a radially extending axial blocking means (15d) corresponding to the axially outer side of the encoder wheel (13).

8. A bearing unit according to claim 1, characterised by the fact that said cylindrical portion (15b) of the rubber element (15) also forms a sealing means in the form of a lip (15e) suitable for coming into direct contact with the outer race (10) of the bearing unit.

9. A bearing unit according to claim 1, characterised by the fact that said constraining means (14a) is comprised of an outer cylindrical portion (14a) for forcefully fitting onto the outer surface (10a) of the outer race (10).

10. A bearing unit according to claim 9, characterised by the fact that said axial abutting means (14b) is comprised of a radial wall of the insert which joins said outer cylindrical portion (10a) to said annular seat (14c).

* * * * *